D. Forrest.
Boot Strap.

No. 88,380. Patented Mar. 30, 1869.

Witnesses:
Wm. A. Morgan
G. C. Cotton

Inventor:
D. Forrest
per Munn & Co
Attorneys

United States Patent Office.

DAVID FORREST, OF EASTPORT, MAINE, ASSIGNOR TO HIMSELF AND JAMES ELDRIDGE, OF SAME PLACE.

Letters Patent No. 88,380, dated March 30, 1869.

---

IMPROVED METALLIC BOOT-STRAP.

---

The Schedule referred to in these Letters Patent and making part of the same.

---

*To all whom it may concern:*

Be it known that I, DAVID FORREST, of Eastport, in the county of Washington, and State of Maine, have invented a new and useful Improvement in Metallic Boot-Straps; and I do hereby declare that the following is a full, clear, and exact description thereof, which will enable others skilled in the art to make and use the same, reference being had to the accompanying drawings, forming part of this specification, in which—

Figure 1:
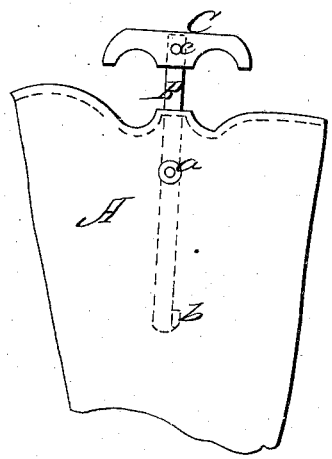
Figure 3:
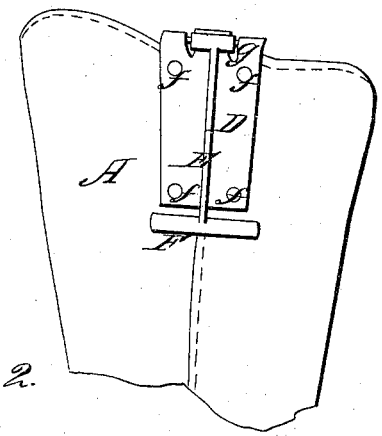
Figure 2:
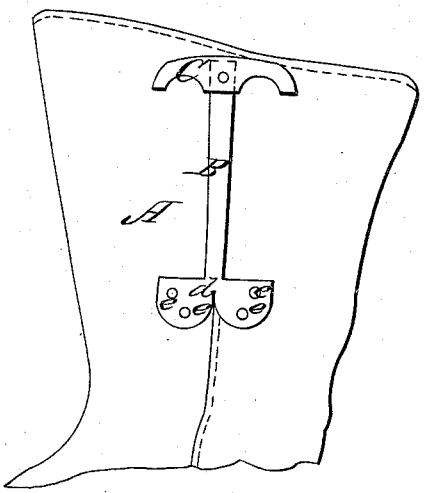

Figures 1, 2, and 3, are side views of a boot-top, showing different modifications of my invention.

Similar letters of reference indicate like parts.

This invention is designed to supersede the ordinary leather boot-straps, which are very liable to be torn off in drawing on tight boots, and which are frequently in the way, and occasion considerable annoyance, especially when of a rigid material.

My invention consists in making the strap, or the principal portion thereof, of metal, and applying it to the boot-top in such a manner as to avoid all inconvenience or annoyance, and at the same time be rigidly attached to the boot-top, so that it cannot be pulled off, or separated therefrom in drawing on the boot.

In the accompanying sheet of drawings—

A represents a boot-top, and B, fig. 1, is a shank, of sheet-metal, which is secured by a rivet, *a*, between the inner surface of the leather and the lining of the boot-top, the lower end of the shank being hooked into the lining, as shown by the dotted lines in fig. 1, at *b*.

To the upper end of the shank B there is attached a handle, C, which may be of wood, the handle being firmly attached to the shank by a rivet, *c*, or by other means.

In this instance, the handle C is a trifle above the boot-top, but by having the shank attached to the outer side of the boot-top, as shown in fig. 2, the handle may be a trifle below, or even with the upper edge of the boot-top.

In the latter case, the lower end of shank B is made broad, as shown at *d*, and secured to the boot-top by rivets *e*.

The handle C is bent laterally, to conform to the shape of the boot-leg, and is provided, upon its under side, with two recesses, to receive the fingers in drawing on the boot.

In fig. 3, a modification of the invention is shown, D being a metal plate, which is secured by rivets, *f*, to the boot-top, and has a rod, E, connected to its top edge by a hinge, or joint, *g*.

To the outer end of the rod E, a handle, F, is attached. This rod and handle, when not in use, drop down by the outer side of the boot-top, and in drawing on a boot, the handle is raised, so that the rod E will extend outward from the boot-top.

It will of course be understood that there is a strap attached to each side of the boot-top, and about in the same position as the ordinary straps.

Having thus described my invention,

I claim as new, and desire to secure by Letters Patent—

The metallic boot-strap, when constructed as described, of the elastic metal shank B, secured to the side of the boot-leg, and provided, at its top, with the curved handle C, recessed upon its under side, as herein described, for the purpose specified.

DAVID FORREST.

Witnesses:
R. B. CLARK,
ELIAS S. KENNY.